Patented Aug. 31, 1937

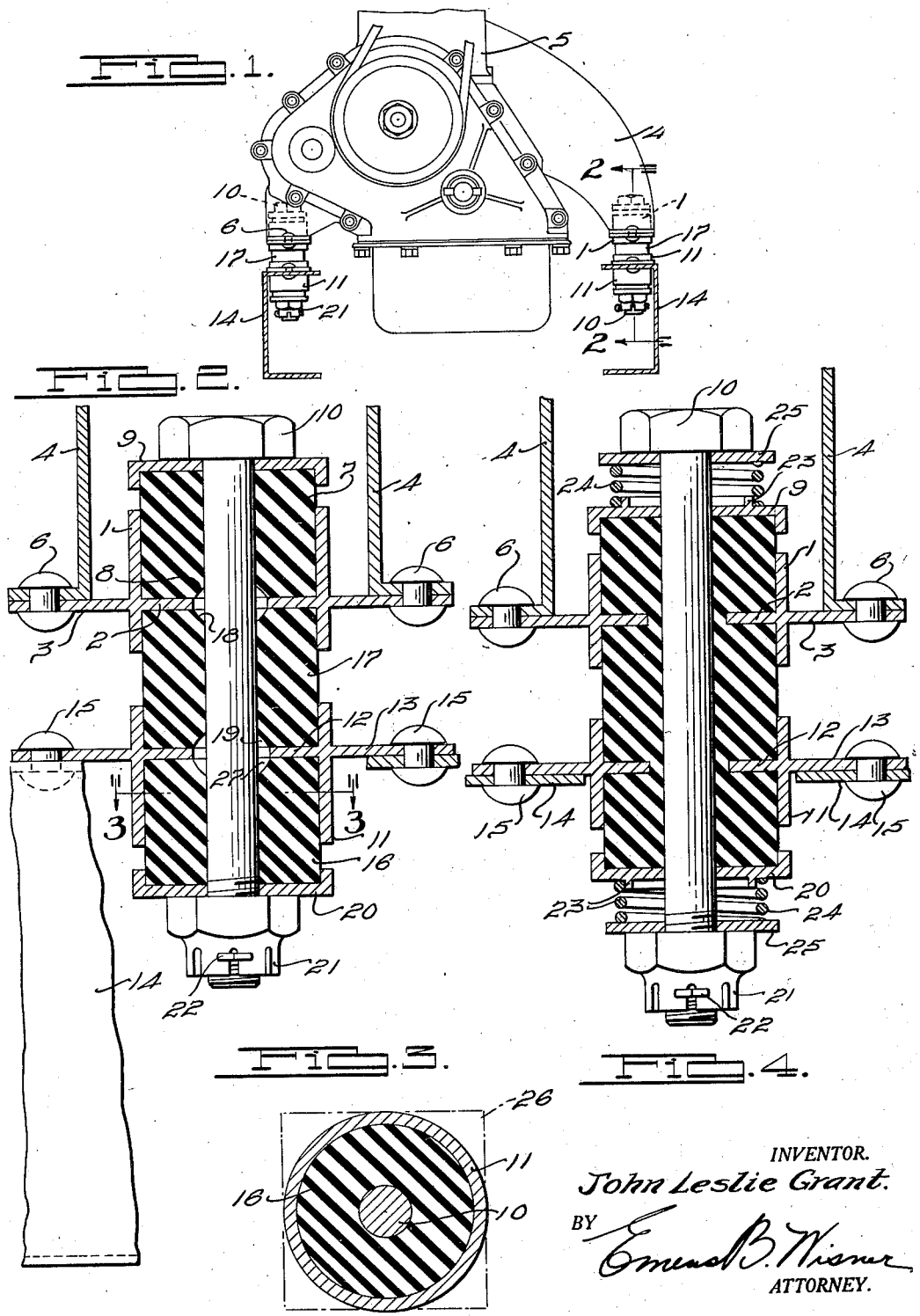

2,091,679

UNITED STATES PATENT OFFICE 2,091,679

AUTOMOBILE ENGINE MOUNTING

John Leslie Grant, Detroit, Mich.

Application September 13, 1935, Serial No. 40,449

1 Claim. (Cl. 248—9)

This invention relates to engine mountings and the object of the invention is to provide a resilient mounting positioned between an engine and its supporting frame and arranged to allow slight vertical and horizontal movement of the engine in relation to its frame.

Another object of the invention is to provide a cushioned engine support which absorbs the inherent vibrations of the engine and prevents the engine vibrations from being transferred to the frame or supporting member for the engine.

A further object of the invention is to provide an engine support including a pair of members each having a partition spaced apart by a rubber block seating against the partitions, additional rubber blocks being provided on the opposite sides of the partitions and a bolt extending through the several rubber blocks and said members to hold the parts together.

A further object of the invention is to provide an engine mounting in which the several rubber blocks may be compressed by relative vertical movement of the members and also arranged so that the members may move transversely, said movement being also resisted by the yielding action of the rubber blocks.

These objects and the several novel features of the invention are hereinafter more fully described and claimed and the preferred form of construction by which these objects are attained is shown in the accompanying drawing in which—

Fig. 1 is a front elevation of an internal combustion engine showing my improved engine mountings connecting the engine to the frame.

Fig. 2 is an enlarged section taken on line 2—2 of Fig. 1.

Fig. 3 is a section taken on line 3—3 of Fig. 2.

Fig. 4 is a section similar to Fig. 2 showing an alternative form of the device.

In the form shown in Figs. 1, 2, and 3 a cylindrical member 1 is provided having an intermediate transverse partition 2 between the ends of said member. On the exterior the member 1 is provided with a peripheral flange 3 to which the supporting arm 4 of the engine 5 may be secured by rivets or bolts 6. A cylindrical rubber block 7 is inserted in the upper end of the member 1 and seats on the partition 2 and this block is provided with a semi-spherical recess 8 adjacent the partition 2. A metal cap 9 is positioned over the upper end of the rubber block 7 and a bolt 10 is inserted through apertures provided in the cap 9 and in the rubber block 7 and in the center of the partition 2. A lower member 11 is provided which is a duplicate of the member 1 but is reversed in position. This cylindrical member 11 is provided with an intermediate transverse partition 12 and with an exterior flange 13 which may be secured to the frame 14 by rivets or bolts 15 as shown in Figs. 1 and 2. A rubber block 16 similar to the rubber block 7 is inserted in the member 11 and seats against the partition 12 and this rubber block is provided with a semi-spherical recess 27 adjacent the partition 12. A central cylindrical rubber block 17 is provided which fits into both members 1 and 11 and engages against the partitions 2 and 12. This rubber block 17 is provided with a semi-spherical recess 18 adjacent the flange 2 and with a semi-spherical recess 19 adjacent the flange 12.

The bolt 10 extends through the rubber blocks 17 and 16 and a metal cap 20 is provided under the lower end of the rubber block 16 through which the bolt 10 extends. A castellated nut 21 is threaded onto the lower end of the bolt and engages against the cap 20 to secure the bolt in position and the nut 21 is locked in position on the bolt by means of a cotter key 22. It will be noted that the diameter of the bolt 10 is considerably less in diameter than the opening through the center of the partitions 2 and 12 so that transverse movement of the member 1 in relation to the member 11 may take place without any metal to metal contact.

With the parts in the position shown in Fig. 2, a downward movement of the engine supporting arm 4 in relation to the frame 14 compresses the rubber block 17 and also compresses the air chambers formed between the rubber blocks by means of the companion spherical recesses 8 and 18 and 27 and 19. Upon upward movement of the engine support 4 in relation to the frame such as would be caused by a rebound after the compression action on the rubber block 17, the partition 2 is moved upwardly to compress the rubber block 7 and as this pulls upwardly on the bolt 10 the rubber block 16 is compressed between the cap 20 and the partition 12 of the member 11. This compression action of the rubber blocks 7 and 16 is also resisted by the semi-spherical air chambers between the rubber blocks, which chambers may compress or expand under movement of the rubber blocks.

In the form shown in Fig. 4, the members 1 and 11 are identical with those shown in Fig. 2 but the rubber blocks instead of being in separate pieces are molded into one continuous piece of solid rubber. Also in this form of the device, the caps 9 and 20 are provided with flanges 23 which form seats for the springs 24 and the bolt 10 is provided with a washer 25 at each end against which the respective springs 24 engage. In this form of the device, the bolt tends to hold the parts together and the bolt 10 prevents them from coming apart while the springs 24 will allow a slightly freer vertical movement of the bolt than the form shown in Fig. 2.

The members 1 and 11 may be made square in form as indicated by the dotted lines 26 in Fig. 3. When these members are square in form, the rubber blocks should also be square or of cube form. By making the parts square as shown, it is also possible to yieldably resist a twisting action of the engine support arm 4 in relation to the frame 14. In this case, the member 1 would twist the rubber in relation to the member 11 and allow a torque action of the mounting as well as an up and down movement and a side thrust from any direction.

While I have suggested rubber blocks or molded rubber for use in the engine mounting, any suitable yieldable material may be used for this purpose. It is also to be noted that the engine mounting absorbs shocks from the engine to the frame as well as shocks from the frame to the engine.

From the foregoing description it becomes evident that the device is very simple and efficient in operation, is composed of few parts and is of consequent low manufacturing cost, will not easily get out of order and provides a device which accomplishes the objects described.

Having thus fully described my invention, its utility and mode of operation, what I claim and desire to secure by Letters Patent of the United States is—

In an engine support, a member adapted for attachment to an engine, a second member adapted for attachment to a frame, each of said members being provided with an intermediate transverse partition having a central aperture and forming compartments above and below the partition, a rubber block molded into both members and filling the compartments in both members, the molded rubber block securing the two members together and continuing through the apertures in the partitions therein, a bolt extending longitudinally through the rubber block, a nut threaded onto the bolt, the bolt being supported by the rubber block in spaced relation with the edges of the apertures in the partitions, a cap for each end of the molded rubber block and supported thereon in spaced relation with said members, a spring between one cap and the head of the bolt, a second spring between the nut and the other cap, the nut being adjustable on the bolt to vary the tension of the springs.

JOHN LESLIE GRANT.